July 7, 1959

H. S. BEATTIE 2,893,312

CHARACTER SELECTION MECHANISM

Original Filed Aug. 25, 1954

*INVENTOR.*
HORACE S. BEATTIE

BY

*Joe L. Koerber*

ATTORNEY

July 7, 1959 H. S. BEATTIE 2,893,312
CHARACTER SELECTION MECHANISM
Original Filed Aug. 25, 1954 9 Sheets-Sheet 2

FIG. 2

INVENTOR.
HORACE S. BEATTIE
BY
ATTORNEY

INVENTOR.
HORACE S. BEATTIE
ATTORNEY

FIG. 5

July 7, 1959  H. S. BEATTIE  2,893,312
CHARACTER SELECTION MECHANISM
Original Filed Aug. 25, 1954  9 Sheets-Sheet 6

FIG. 6

INVENTOR.
HORACE S BEATTIE

BY Joe L. Koerber

ATTORNEY

FIG. 10

INVENTOR.
HORACE S. BEATTIE

ATTORNEY

FIG. 12

INVENTOR.
HORACE S. BEATTIE

ATTORNEY

United States Patent Office 2,893,312
Patented July 7, 1959

2,893,312

CHARACTER SELECTION MECHANISM

Horace S. Beattie, Poughkeepsie, N.Y., assignor to International Business Machines Corporation, New York, N.Y., a corporation of New York Original application August 25, 1954, Serial No. 452,156, now Patent No. 2,826,139, dated March 11, 1958. Divided and this application November 12, 1957, Serial No. 695,773

8 Claims. (Cl. 101—93)

This invention relates to a type element selecting and positioning device and more particularly to such a device utilizing the incremental foreshortening of a cable to select characters.

In this type of device a set of characters is arranged on a character strip which is selectively displaced discrete distances longitudinally to bring a selected character to a print position. A device of this general type, in which a character is selected by foreshortening a cable, is illustrated in U.S. Letters Patent 2,661,683. The device shown there has four pulleys operable for foreshortening the cable and requires a magnet for each pulley. This application is a division of a copending application, Serial No. 452,156, filed August 25, 1954, on behalf of Horace S. Beattie, now Patent No. 2,826,139. The instant device similarly has four pulleys but requires only a single magnet. This improved design is well adapted to control by the sensing of a punch record card wherein a character may be represented by a single perforation and a circuit completed by sensing this single perforation is utilized to energize the single magnet to position at a print line, a character corresponding to the sensed perforation.

Accordingly, it is an object of this invention to provide an improved device for positioning a print element selectively through incremental foreshortening of a cable.

Another object of this invention is to provide a character positioning device comprising a plurality of pulleys operable selectively for foreshortening a cable by selected increments by the timed actuation of a single operating element.

Other objects of the invention will be pointed out in the following description and claims and illustrated in the accompanying drawings, which disclose by way of example, the principle of the invention and the best mode which has been contemplated of applying that principle.

The device is illustrated as incorporated in a machine having a card supply hopper for holding prepunched cards into which the data to be printed has been punched in code. A feed mechanism is provided to feed the cards serially from the hopper past a first read station where the odd numbered columns are sensed, and then past a second read station where the even numbered columns are sensed.

Mechanisms for positioning the print element strips by foreshortening cables are controlled by timed impulses from the reading of the card perforations. A type hammer is operated from a constantly running shaft and cam means are provided for alternately shifting the character strips for printing in adjacent columns. Ribbon and paper feeding means are provided.

Figure 1:
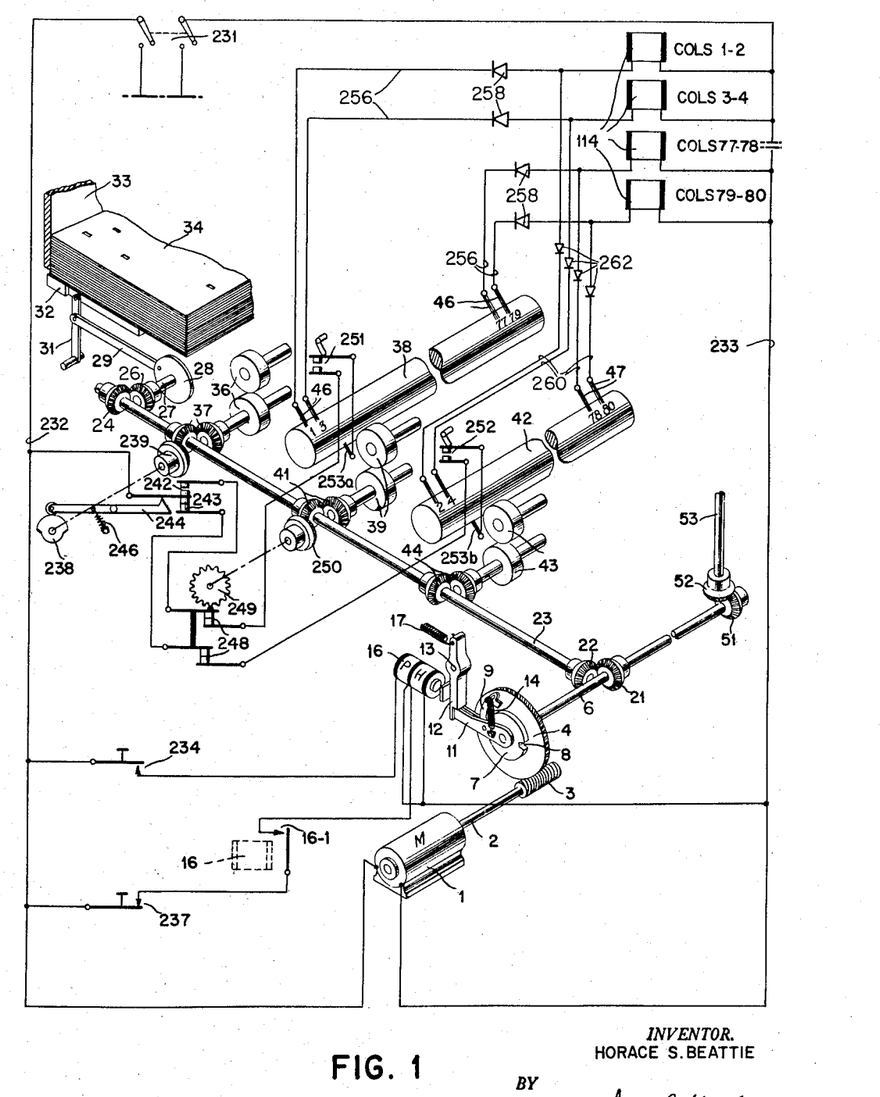
Figure 1 is a combined wiring diagram and a schematic showing of the card feeding and sensing unit and the motive power for the machine.

Referring to Figure 1, a motor 1 is suitably mounted on the frame of the machine. A motor shaft 2 carries a worm 3 that meshes with a worm gear 4 that is rotatably mounted on a shaft 6 that is journaled in the machine frame. A clutch disc 7 having a notch 8 that is adapted to be engaged by a dog 9 is fixed to the gear 4. The dog 9 is pivotally mounted on the arm 11 that is fixed to the shaft 6. A latch 12 that is pivotally supported at a point 13 is adapted to engage a tail portion of the dog 9 and the end of the arm 11 to hold the dog 9 disengaged from the notch 8 against the action of a spring 14, and to prevent the arm 11 from rotating. An electromagnet 16 is positioned adjacent the latch 12 and, when energized, attracts the latch 12 and releases the dog 9 and the arm 11. The dog 9, compelled by the spring 14, engages the notch 8 providing a driving connection from the gear 4 through the disc 7, the dog 9, and the arm 11 to the shaft 6 that is rotated in a clockwise direction. The arm 11 and dog 9 rotate with the gear 4 until the magnet 16 is de-energized at which time the latch 12 pivots back into the paths of the dog 9 and arm 11, under compulsion of a spring 17, withdrawing the dog 9 from the notch 8 and stopping the rotation of the shaft 6.

A bevel gear 21 is mounted on the shaft 6 and meshes with a second bevel gear 22 that is fixed to a shaft 23 disposed at 90° to the shaft 6. A bevel gear 24 is fixed to the opposite end of the shaft 23 and meshes with a bevel gear 26 fixed to a shaft 27. The shaft 27 has a circular disc 28 fixed to the opposite end thereof and has a rod 29 pivotally pinned thereto in an off-center position. The opposite end of the rod 29 is pivotally pinned to a lever 31, the lower end of which is pivotally pinned to a stationary frame member and the upper end of which is connected to a feed knife 32. The feed knife 32 is positioned adjacent a card hopper 33 and is adapted, when given a reciprocating motion by the rotation of the gear 26 and the disc 28, to feed cards 34 serially from the hopper 33 into a pair of feed rolls 36, the lower one of which is driven from the shaft 23 through bevel gears 37. From the feed rolls 36, the cards are fed over a metal contact roll 38 journaled in the machine frame which may be suitably geared to the shaft 23. The cards are fed into a second set of feed rolls 39 that are driven from the shaft 23 through bevel gears 41, thence over a second contact roll 42 that may be mounted and driven similarly to the roll 38, and into a third set of feed rolls 43 that are driven from the shaft 23 through bevel gears 44. As each card leaves the feed rolls 43, it drops into a receptacle that is not shown.

Above the contact roll 38 and in contact therewith are mounted forty brushes 46 that are positioned to sense perforations in the odd numbered columns of the usual punched card. Similarly, forty brushes 47 are mounted above the contact roll 42 to sense perforations in the even numbered columns of a card.

Figure 2:
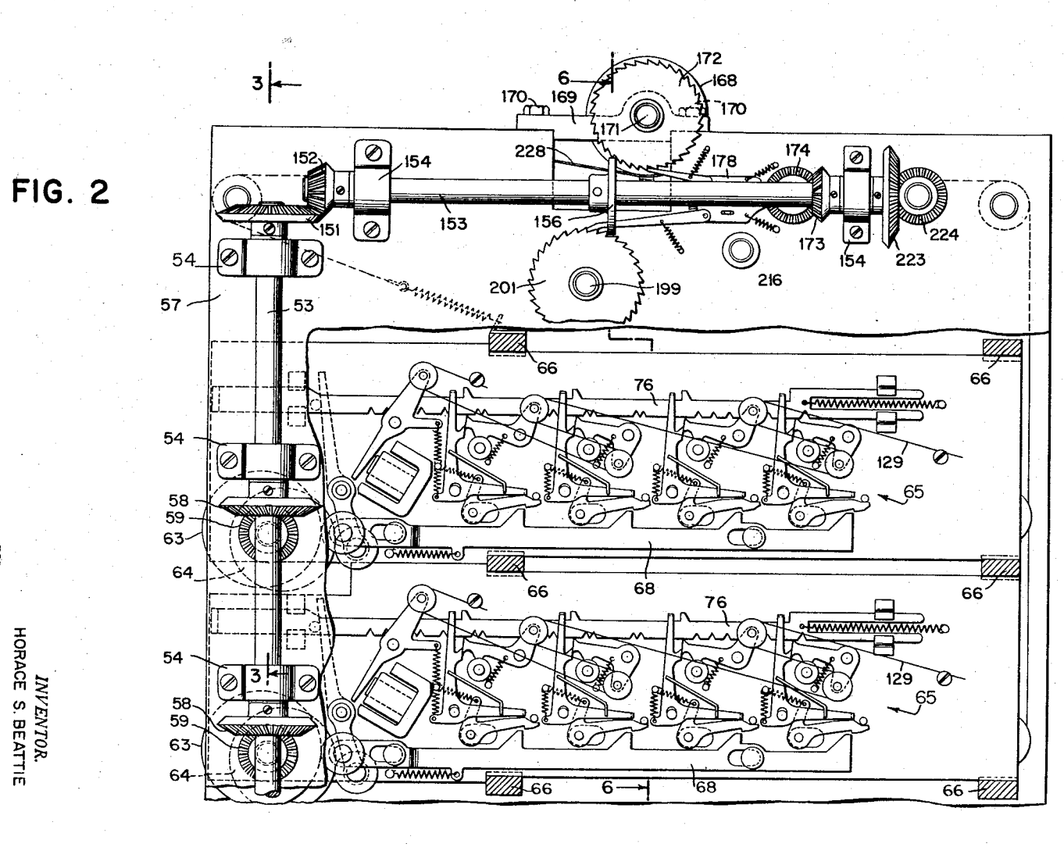
Figure 2 shows the gear and shaft power train and the staggered positions of the setup units on an upper and a lower level.
Figure 3:
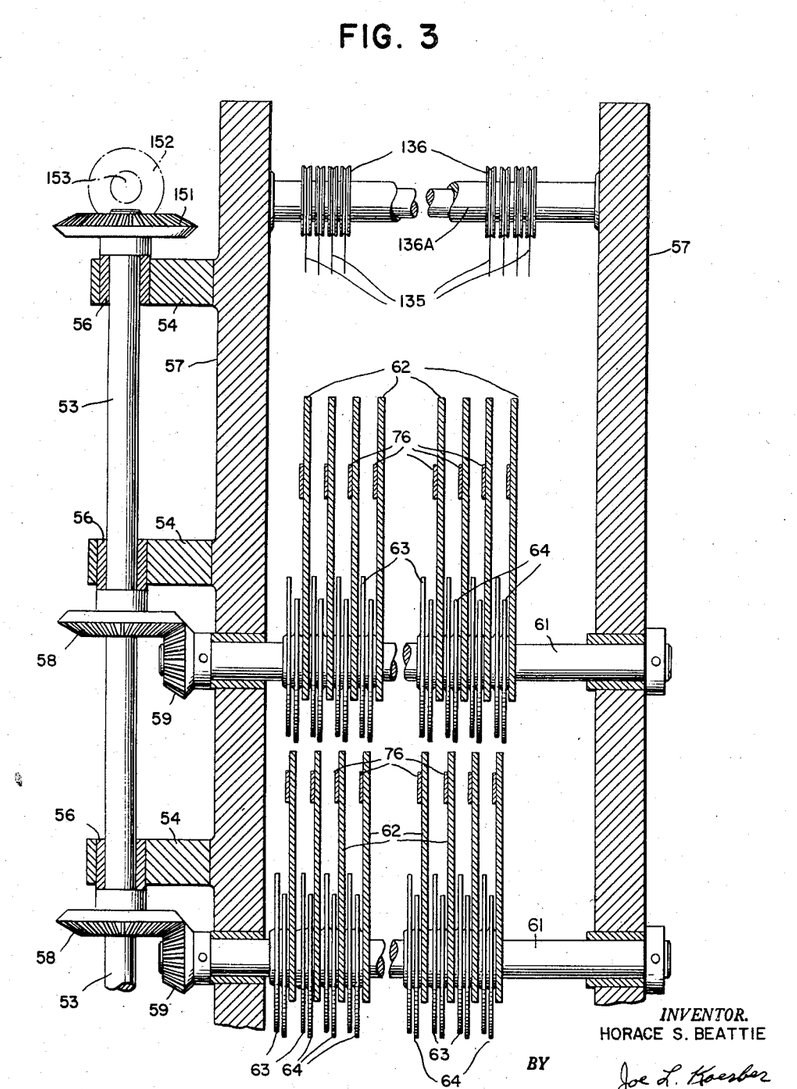
Figure 3 is a sectional view taken along the line 3—3 in Figure 2 illustrating the power train and the plurality of pairs of cams for transmitting the power to each setup unit.

A bevel gear 51 is mounted on the opposite end of the shaft 6 and meshes with a bevel gear 52 that is mounted on a vertical shaft 53. Referring to Figures 2 and 3, the shaft 53 is mounted by means of brackets 54 and bearings 56 on a side frame piece 57. A pair of bevel gears 58 are mounted on the shaft 53 and mesh with bevel gears 59 that are mounted on shafts 61 journaled in the side frame pieces 57. A plurality of pairs of cams 63 and 64 are mounted on the shafts 61 between plates 62 that are mounted on cross pieces 66 between the frame pieces 57 as shown in Figure 2.

Figure 6:
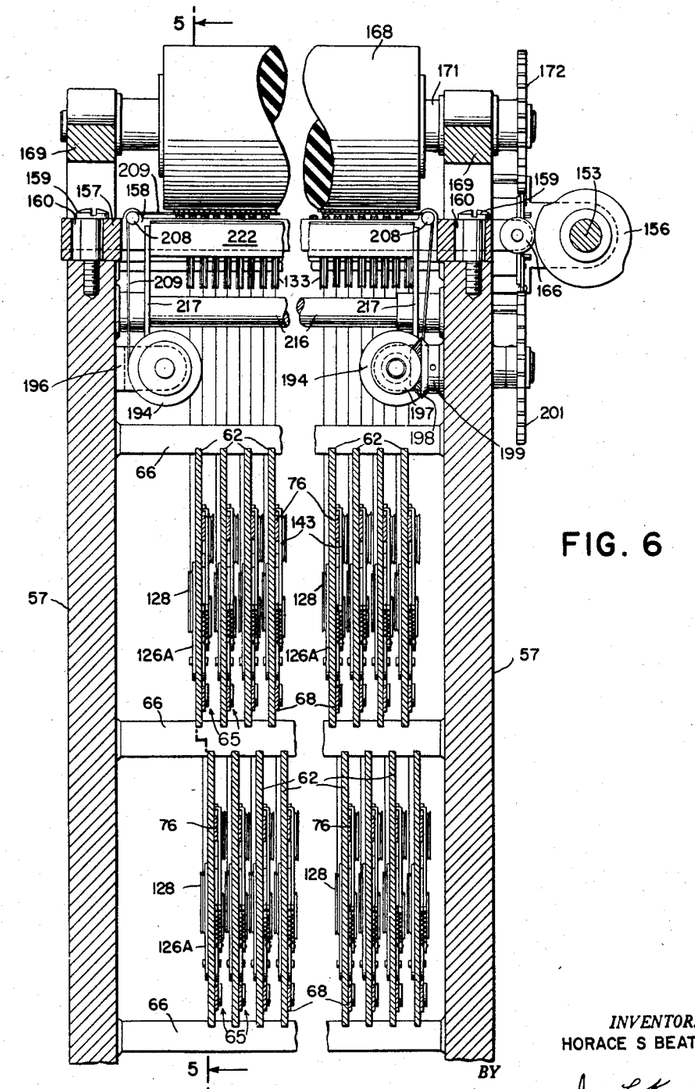
Figure 6 is a sectional view of the machine taken along the line 6—6 in Figure 2.

Two of a plurality of character selection mechanisms, an end view of which is shown in Figure 6, are shown in Figure 2. A character selection unit is generally designated 65. It is necessary to distribute these selection mechanisms on two levels in a staggered fashion as shown in Figure 6 in order to mount the required number of units in the available space. The description of one of the units 65 will suffice for all since all are identical.

Figures 4, 11:
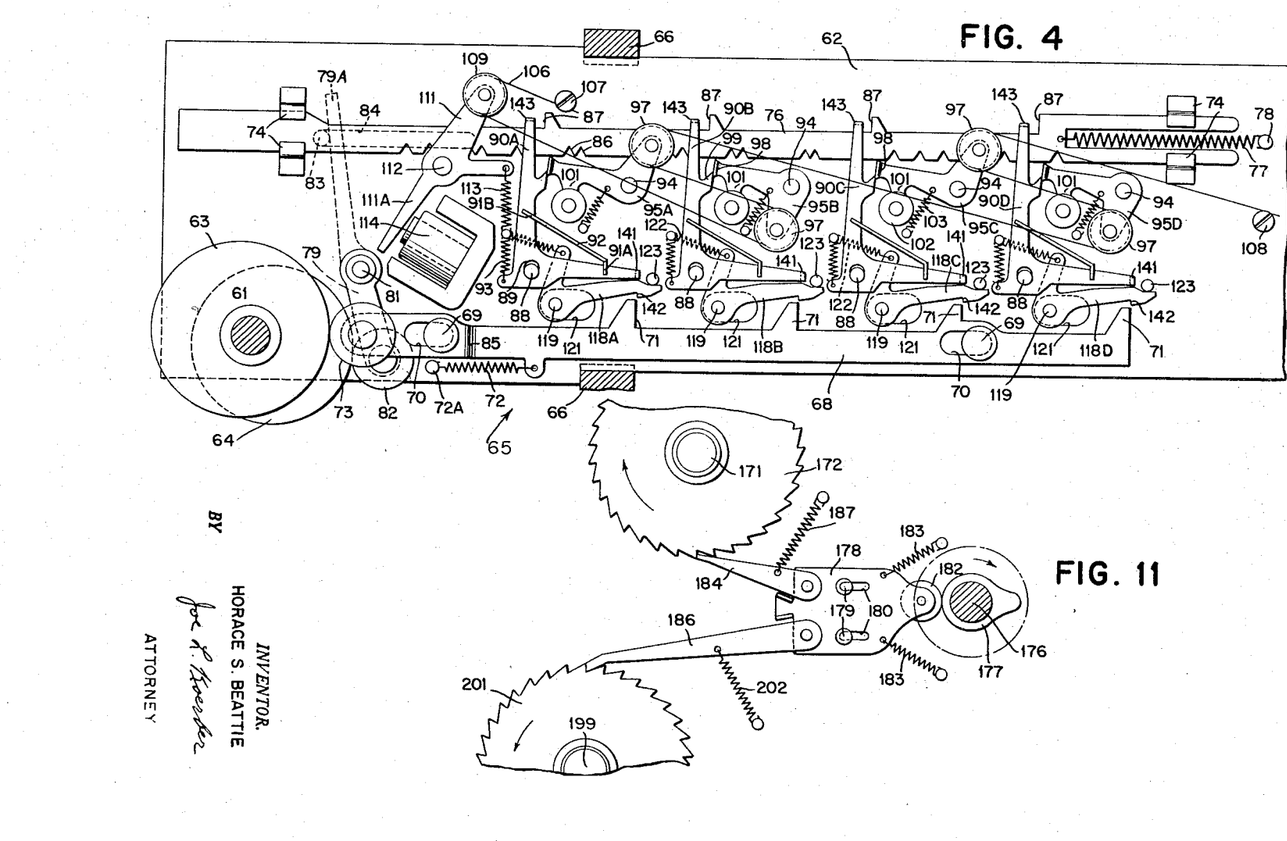
Figure 4 is an enlarged view of a single setup unit shown in Figure 2.
Figure 11 is a detail view of the record and ribbon advancing mechanisms.

Referring to Figure 4, the plate 62 is mounted on the cross pieces 66 as described. The shaft 61 and cams 63 and 64 are driven constantly by the motor 1 when the clutch 7 is engaged. A lower or actuating slide 68 is slidably mounted on the plate 62 by means of two studs 69 and two slots 70 and is biased to the left by a spring 72 that is fastened to the plate 62 by a stud 72A. Four lugs 71 extend from the top edge of the slide 68. A cam roller 73 is rotatably mounted on the left end of the slide 68 and rides on the cam 63. For each revolution of the cam 63, the slide 68 oscillates first to the right and then back to the left.

A second slide 76 that is slidably mounted on the plate 62 by means of two pairs of brackets 74 is biased to the right by a spring 77 that is fastened to a stud 78 on the plate 62. A cam follower arm 79 that is pivotally mounted by a pin 81 on the plate 62 has a cam roller 82 rotatably mounted thereon that rides on the cam 64. An upper cam arm 79A is mounted on the pivot 81 on the back side of the plate 62 to avoid interfering with other working parts.

When the cam 64 rotates, the cam follower arms 79 and 79A oscillate and transfer the oscillating movement to the slide 76 through a stud 83 that is affixed to the slide 76 and extends through a slot 84 in the plate 62 to intercept the arm 79A. The slide 68 is bent away from the plate 62 at a point designated 85 to provide clearance for the cam follower arm 79. A series of coded notches 86 are formed in the lower edge of the slide 76 and three lugs 87 and an offset portion that also is designated 87 extend from the top of the slide 76.

Four bell cranks 90 A, B, C and D are pivotally and shiftably mounted on the plate 62 by means of pins 88 and elongated holes 89. Each crank 90 is guided at two points 91A and 91B by a comb member 92 that is affixed to the plate 62. Each crank 90 is biased in a clockwise direction by a spring 93.

Four other bell cranks 95 A, B, C and D are pivotally mounted on the plate 62 by studs 94. Each bell crank 95 has a pulley 97 pivotally mounted thereon. A lug 98 on each bell crank 95 engages a lug 99 on each corresponding bell crank 90. Another lug 101 on each bell crank 95 rests on a stop member 102 that is mounted on the plate 62. The bell cranks 95 are biased in a counterclockwise direction against the stop members 102 by springs 103.

A steel wire 106 that is affixed to the plate 62 at points 107 and 108 passes over a pulley 109 on one arm of a lever 111 that is pivotally mounted on the plate 62 by a pin 112 and is biased in a clockwise direction by a spring 113. From the pulley 109, the wire 106 passes over the pulleys 97 as shown in Figure 4. A lower arm 111A of the lever 111 serves as the armature for an electromagnet 114 that is mounted on the plate 62.

Figure 5:
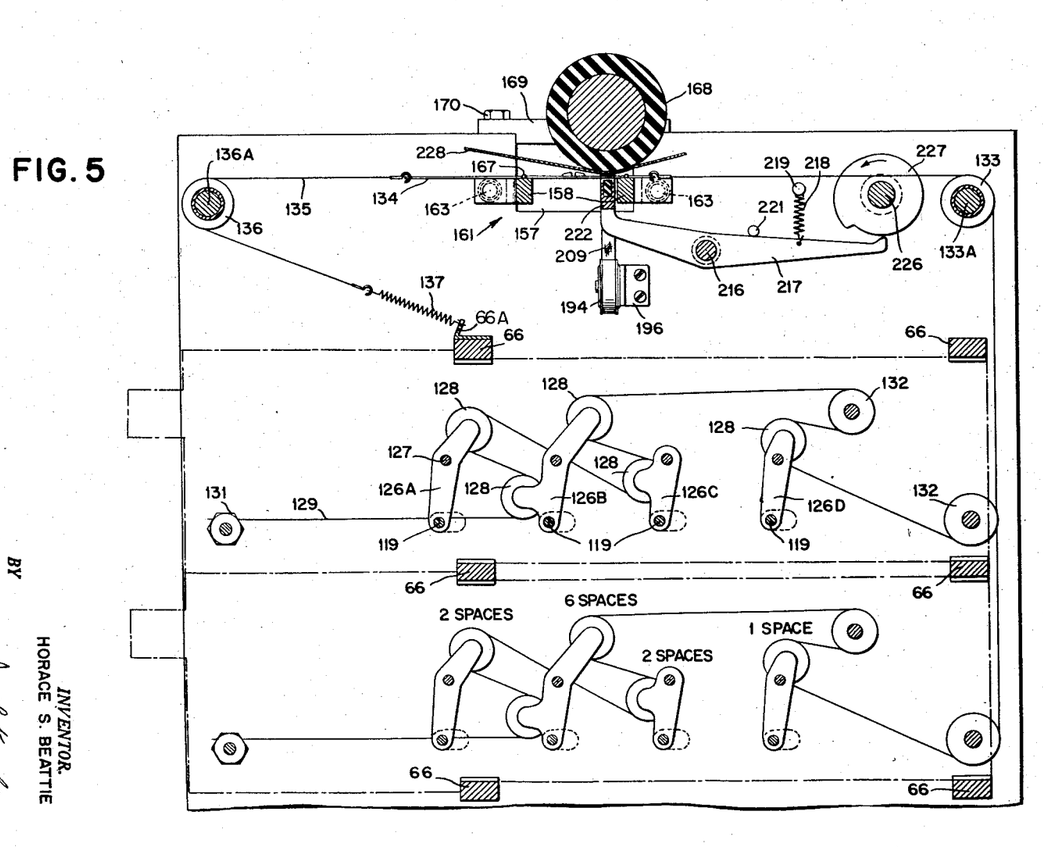
Figure 5 is a view taken on the plane 5—5 of Figure 6 and shows the mechanism for longitudinally positioning a print element strip in response to the actuation of the setup units shown in Figures 2 and 4.
Figure 10:
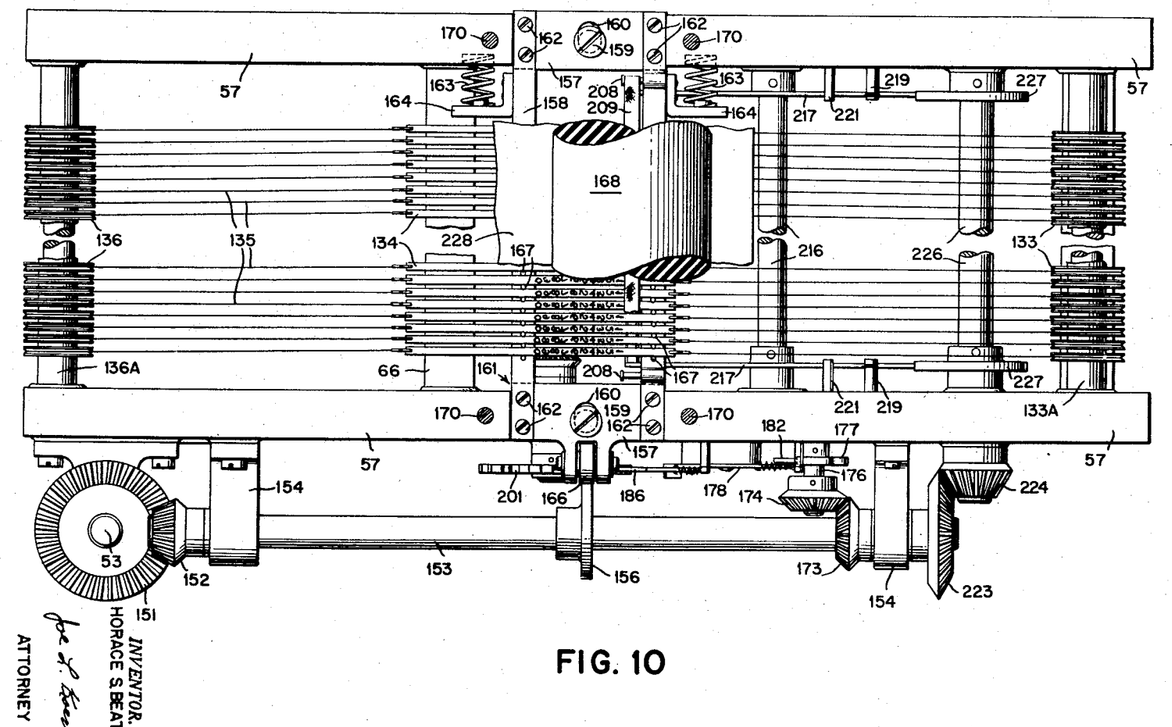
Figure 10 is a top view of the machine.

Four bell cranks 118 A, B, C and D are pivotally mounted on pins 119 that extend through slots 121 in the plate 62. The cranks 118 are biased in a counterclockwise direction by springs 122 against stop studs 123 that are mounted on the plate 62. Referring to Figure 5, the mechanism shown is mounted on the back side of the plate 62 and co-operates with the mechanism shown in Figure 4. The pins 119, Figures 4 and 5, are pivoted in bell cranks 126 A, B, C and D that are pivotally mounted on the plate 62 by studs 127. Pivotally mounted on the four cranks 126 are five pulleys 128. A steel wire 129 is affixed to the plate 62 by a nut 131 and passes over the pulleys 128 as shown in Figure 5, and over two pulleys 132 that are pivotally mounted on the plate 62. The wire 129 passes from the last pulley 132 over a pulley 133 pivotally mounted on a shaft 133A journaled in the frames 57 as shown in Figures 5 and 10. A type element strip 134 is affixed to the free end of the wire 129 and, from the other end of the strip 134, a wire 135 passes over a pulley 136 pivotally mounted on a shaft 136A journaled in the frames 57 as shown in Figures 3 and 10. The other end of the wire 135 is yieldingly affixed by means of a spring 137 to a lug 66A carried by one of the cross pieces 66. Figure 6 is a left end view of a plurality of the above described setup and positioning mechanisms that are mounted on the plates 62.

Figure 7:
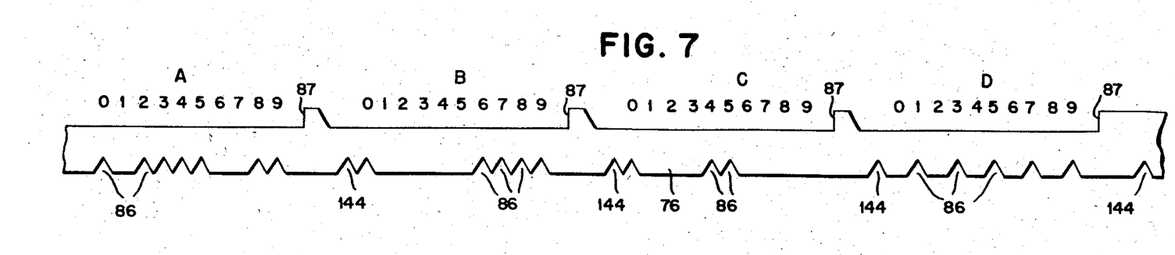
Figure 7 is an enlarged view of the coded setup slide shown in Figures 2 and 4.
Figure 8:
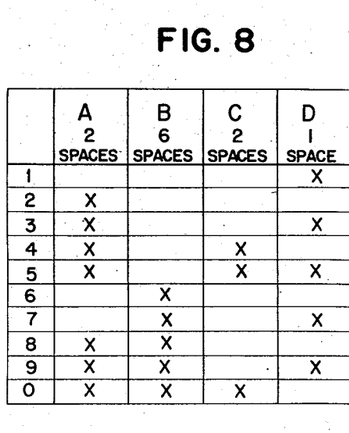
Figure 8 indicates the code that is built into the slide of Figure 7.

Referring to Figure 7, the coded slide 76 is shown in detail and in Figure 8 the slide code is indicated. It will be noted in Figure 7 that the slide is divided into four sections, A, B, C and D, each section having eleven sub-divisions. Each numeral, zero through nine, is represented by a notch 86 in one or more of the four sections as indicated in Figures 7 and 8. For example, a zero is represented by notches in sections A, B and C, whereas a one is represented by a single notch in section D.

Figure 9:
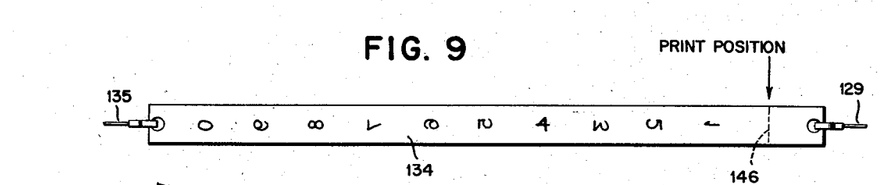
Figure 9 illustrates a single print element strip.

The numerals are arranged on the type element strips serially from one through zero as indicated in Figure 9. The location of the notches in the slide 76 is dependent on the order of the numerals on the type strip and the units of movement of the various bell cranks 126 as indicated in Figure 8. When it is actuated, the bell crank 126A moves the type strip two units of space, the crank 126B moves the strip 6 units of space, the crank 126C moves the strip 2 units of space and the crank 126D moves the strip one unit of space. The variations in movements are determined by the differences in the lengths of the lever arms 126 from the pivot points 127 to the pulleys 128 and from the pivot points 127 to the pins 119. Any desired increment of movement is obtained by actuating one or more of the bell cranks 126 whereby the units of movement of the actuated bell cranks accumulate to the desired total movement.

Referring again to Figure 4, the slides 68 and 76 reciprocate constantly in response to the rotation of the cams 63 and 64. The slides move to the right with the slide 76 leading the slide 68 due to the configuration of the cams 63 and 64. On the return to the left, the slide 68 leads the slide 76 for reasons that will be explained.

The movement of the slide 76 to the right is synchronized with the passage of a card under the first reading brushes 46. When a hole is sensed in a card column corresponding to a particular one of the odd numbered setup units 65, the magnet 114 for that particular unit is energized. For example, suppose a "5" hole is punched in column 1; the slide positions 9, 8, 7 and 6 pass by the point immediately above the lugs 98 on the bell cranks 95, and at the instant the "5" hole is sensed, the "5" positions of the slide 76 are positioned directly above the lugs 98. Due to the contact made by the column 1 brush 46 to the contact roll 38, the magnet 114 is energized and attracts its armature 111A. The pivoting of the armature 111A and the arm 111 swings the pulley 109 to the left and causes, in effect, a shortening of the wire 106 that tends to pivot each bell crank 95 clockwise. At that instant the "5" positions of the slide 76 are positioned above the lugs 98 of bell cranks 95 A, B, C and D. In the sections A, C and D of the slide 76, there are notches 86 in the "5" position and the bell cranks 95 A, C and D are allowed to pivot because the associated lugs 98 enter the three notches 86. The fourth bell crank 95B cannot pivot due to the absence of a notch 86. When the bell cranks 95 pivot, the lugs 98 slip off the lugs 99 of the bell cranks 90 A, C and D which then pivot in a clockwise direction under tension of their springs 93. Protruding at right angles from the extreme right ends of the cranks 90, Figure 4, are lugs 141. When the cranks 90 pivot in a clockwise direction these lugs 141 strike the bell cranks 118 A, C and D causing the latter also to pivot in a clockwise direction. After the slide 76 has traversed all of the notch positions from nine through zero, the lugs 71 of the slide 68 that also is moving to the right, reach step portions 142 that are formed in the cranks 118. The step portions 142 of the actuated cranks 118 A, C and D are in the paths of the slide lugs 71 and are struck thereby and driven to the right. The movement of the cranks 118 A, C and D is transferred through the respective pins 119 to the bell cranks 126 A, C and D on the back side of the plate 62 as shown in Figure 5. The cranks 126 A, C and D are pivoted in a counterclockwise direction thereby effectively shortening the wire 129 by five units, two units due to the pivoting of the crank 126A, two units due to the pivoting of the crank 126A, and one unit due to the pivoting of the crank 126D. The corresponding type element strip 134 is consequently shifted five units to the right thereby positioning the number "5" type element in alignment with a print line. A print hammer 222 is actuated in a manner described hereinafter thereby printing a number "5."

The cams 63 and 64 continue to rotate and, with the lower slide 68 leading, the slides return to the left. As the four vertical surfaces 87 that extend from the top of the slide 76 reach the assumed position of the actuated bell cranks 90 A, C and D, the surfaces 87 engage lugs 143 that are formed at right angles to the extreme upper ends of the bell cranks 90 and extend into the path of the surfaces 87 and drive the cranks 90 A, C and D in a counterclockwise direction to a point that is beyond their normal latch positions. After the punched hole "5" passed the sensing brush 46, the magnet 114 was de-energized thereby releasing the armature 111A and allowing the latter to return to its normal position under compulsion of its spring 113. The bell cranks 95 A, C and D, are thereby released and are returned to their normal positions under compulsion of their springs 103 where the lugs 98 engage the lugs 99 of the cranks 90 A, C and D and latch the latter cranks in their normal positions. It will be noted that there is not sufficient room between the upper point of the lugs 99 and the lower unnotched edge of the slide 76 to accommodate the lugs 98. For that reason, an extra notch 144, as shown in Figure 7 is placed at the right of each slide section A, B, C and D to receive the lug 98 momentarily as the latter is cammed upwardly by the lug 99 when the crank 90 is driven counterclockwise by the lugs 87.

After the bell cranks 90 have been latched in their normal positions and the slides 68 and 76 have been fully returned to the left, a second read and print cycle commences. The continuously moving punched card reaches the second read station and the slides 68 and 76 again move to the right in synchronism with the sensing of the even numbered columns of the card by the sensing brushes 47 to set up the code slides 76.

It will be noted that all of the odd numbered 9's are set up first, then the odd 8's, odd 7's and so on down to the odd 0's.

TYPE STRIP SHIFTING MECHANISM

Referring to Figures 3 and 10, a bevel gear 151 is fixed to the upper end of the shaft 53 and meshes with a bevel gear 152 to drive a shaft 153 that is mounted on the frame 57 by bracket and bearing members 154. A cam 156 is fixed to the shaft 153 and functions to shift the type element strips 134 alternately to adjacent odd and even print columns.

Referring to Figures 5 and 6 and especially to Figure 10, a frame consisting of end pieces 157 and cross pieces 158 is slidably mounted atop the frame pieces 57 by means of two bolts 159 and elongated slots 160. The frame is generally designated 161. The cross pieces 158 are affixed to the end pieces 157 by screws 162 and the slidable frame is biased to the front, as seen in Figure 10 by springs 163. The springs 163 are recessed in holes bored in the rear frame 57 and act on lugs 164 fixed to the cross pieces 158. The frame 161 is shifted to the left, as viewed in Figure 6, by the action of the high dwell of the cam 156 on a cam follower 166 that is mounted on the frame 161 for positioning the print elements in the odd numbered columns and is returned to the right by the action of the springs 163, the cam follower 166 and the low dwell of the cam 156 for positioning the print elements in the even numbered columns.

A row of studs 167, shown in Figures 5 and 10, extend from the upper surface of each cross piece 158. The studs are equally spaced and are adapted to guide the type element strips 134 and to aid in shifting the strips 134 laterally to alternate columns when the frame 161 is shifted.

After all of the odd column code slides 76 are set up and the frame 161 is shifted laterally to position the type element strips 134 in the odd printing columns, the print hammer 222 that spans all of the print columns is actuated to print, simultaneously, all of the characters for which code slides 76 have been set up. The slides 68 and 76 are then returned to the left and the even numbered columns of the same card are read and selected type elements are set up as described hereinbefore. The print elements are shifted to the right to the even numbered print positions and the print hammer 222 is actuated a second time.

In columns that are to be left blank, as between columns of numbers, the strips 134 remain in their normal positions wherein none of the print elements are positioned at the print line as indicated at a point 146 in Figure 9 and when the print hammer 222 is actuated, the desired columns are left blank.

Example

Assume that the following line of figures is to be printed:
 5 0 5  2 0  9 6 5 4  95291  8  31  24

In Step #1 the numbers appearing in the odd numbered print columns are printed.

In Step #2 the numbers appearing in the even numbered print columns are printed.

The results, by steps, appear as follows:

Step #1 __________ 5 5 2     6 4 9 2 1  8   3    4
Step #2 __________ 0    0 9 5    5 9         1 2
Steps #1 and #2 _ 505  20  9654  95291  8  31  24

It is apparent, from the foregoing example, that an entire line may be printed in two steps, each step comprising the setup of print elements and the actuation of a print hammer which spans the entire print line.

PAPER FEEDING MECHANISM

Referring to Figures 2, 6, 10 and 11, a platen 168 is rotatably mounted by supports 169 that are fixed to the frames 57 by bolts 170. A platen shaft 171, shown in Figures 2 and 11, carries a ratchet wheel 172. A bevel gear 173 is fixed to the shaft 153 and meshes with a bevel gear 174 that is fixed to a shaft 176, shown in Figure 10, and is journaled in one frame piece 57. The shaft 176 carries a cam 177 that operates a cam follower slide 178 slidably mounted on the frame 57 by studs 179 and slots 180. The slide 178 carries a cam roller 182 and is biased to the right by springs 183. The slide 178 has two ratchet pawls 184 and 186 that are pivotally mounted thereon. The ratchet pawl 184 is biased in a clockwise direction by a spring 187 and engages the teeth of the ratchet wheel 172. During each revolution of the shaft 176, the cam follower 178 is shifted to the left by a high dwell of the cam 177 and, through the pawl 184, effects one unit of line spacing. When the roller 182 drops to the low dwell of the cam 177, the cam follower 178 and the pawl 184 return to their normal positions and the pawl 184 takes a new purchase on the ratchet wheel 172 preparatory to the next spacing operation.

RIBBON SPACING MECHANISM

Referring to Figure 6, two ribbon spools 194 are pivotally mounted on brackets 196 affixed to the frames 57. The right hand ribbon spool 194 has a bevel gear 197 affixed to its top flange. The gear 197 meshes with a bevel gear 198 mounted on a shaft 199 that is rotatably mounted in the frame 57. The shaft 199 carries a ratchet wheel 201 that is similar to the ratchet wheel 172. Referring to Figure 11, the pawl 186 is spring biased in a counterclockwise direction by a spring 202 and engages the teeth of the ratchet wheel 201 to effect a unit of ribbon movement during each rotation of the cam 177 in a manner similar to that in which the line spacing is accomplished as described hereinbefore.

Two ribbon guide pegs 208 are mounted on the frame 161 as shown in Figures 6 and 10, for aligning a print ribbon 209 adjacent the platen 168 at the print position.

HAMMER MECHANISM

Referring to Figures 5 and 10, a shaft 216 is journaled in the side frames 57 and carries two print hammer arms 217 that are biased in a counterclockwise direction by springs 218 fastened to studs 219 that in turn are fixed in the frames 57. The hammer arms 217 normally are held against stop studs 221 fixed in the frame members 57. A bevel gear 223 is fixed to the end of the shaft 153, as shown in Figure 10, and meshes with a bevel gear 224 fixed to a shaft 226 that is journaled in the side frames 57. The shaft 226 carries two cams 227 that engage the print hammer arms 217. The cams 227 actuate the print hammer once during each revolution of the shaft 226. The print hammer arms 217 are connected by a print hammer 222 that is rubber padded. When the high points of a cam 227 engage the print hammer arms 217, the latter are pivoted in a clockwise direction thrusting the rubber padded bar 222 forcibly against the backs of the selected type elements thereby driving the type elements against the type ribbon 209 and a record sheet 228.

CIRCUIT DESCRIPTION

Referring to Figure 1, the motor 1 is started by closing a main line switch 231 that connects the lines 232 and 233 to a power supply. Normally open start key contacts 234 are closed momentarily completing a circuit from the line 232 through a pick coil 16-P of the magnet 16 to the line 233 thereby engaging the clutch 7. A relay point 16-1 that is operated by the magnet 16 completes a hold circuit from the line 232 through normally closed stop key contacts 237, the relay point 16-1 and a hold coil 16-H of the magnet 16, to the line 233. The clutch 7 may be disengaged by depressing the stop key 237 thereby breaking the circuit to the hold coil 16-H and de-energizing the magnet 16.

Means are provided to prevent shorting the brushes 46 and 47 on the respective contact rolls 38 and 42 between cards and when a card is not present in the sensing station. Means are provided also to make and break the sensing circuits at a point other than at the brushes 46 and 47 to prevent arcing and burning of the brushes. Means are also provided to connect the rolls 38 and 42 to the line 232 alternately since only one roll is used at any one time.

A cam 238 is driven from the shaft 23 through one of the bevel gears 37 and a bevel gear 239 and has a 180° high dwell and a 180° low dwell that operate to open and close two sets of contacts 242 and 243 alternately by means of a cam follower arm 244 that is biased against the cam 238 by a spring 246. Between each of the sets of contacts 242 and 243 and their respective contact rolls 38 and 42, cam contacts 248 are inserted that are operated by a cam 249 that is driven from the shaft 23 through one of the bevel gears 41 and a bevel gear 250. The gear ratio is such that the cam 249 is rotated at twice the speed of the cam 238. The lobes on the cam 249 are shaped and positioned to make the contacts 248 after the brushes 46 or 47 have contacted the rolls 38 or 42 through each punched hole and to break before the brushes break contact with the roll as each hole progresses past the brushes. Pairs of normally open card lever contacts 251 and 252 are inserted between the contacts 248 and the respective contact rolls 38 and 42. Contacts 251 or 252 are closed only when a card is present in the corresponding sensing station. A circuit is maintained continuously from the card lever contacts 251 and 252 to the respective contact rolls 38 and 42 through brushes 253a and 253b. When a circuit is completed from the line 232 to the contact roll 38 and from the roll 38 through a punched hole, for example, to the brush 46 for column 1, a circuit is then completed through an attached line 256, a rectifier 258 and the column 1-column 2 magnet 114 as shown in Figure 1 to the line 233. The magnet 114 actuates the associated unit 65 to set up the appropriate type element as described hereinbefore. When the card advances to the second station, the same magnet 114 will be energized through a line 260 and a rectifier 262 upon the sensing of a hole in column 2 to actuate the same unit 65 and the same type element strip 134 as was used for the set-up for column 1. Similarly, each unit 65 and each strip 134 is common to a pair of adjacent print columns.

TIMING CHART

The printer operates on a 32 point cycle. Referring to the timing chart shown in Figure 12, the chart commences at the left hand side with the last two cycle points of the previous card cycle. During cycle points 31 and 32 the type strips are in their previous printing position to the right, the slides 68 and 76 have completed their restoring movements to the left, the record is fed one space as is the ribbon. The cam contacts 242 close and the contacts 243 open. When a card enters the first reading station, the card lever contacts 251 close and as the card progresses under the brushes 46, the cam contacts 248 make and break once during each cycle point. The numeric positions of all of the odd numbered columns are sensed serially from nine through zero. A brush contact is made through each hole in the odd numbered card columns.

During cycle point 9, while the "1" positions of the card are being sensed, the type strips 134 are shifted laterally, as described hereinbefore, to occupy the odd numbered print positions. After the sensing of the "0" position of the card during cycle point 10, the type element strips are positioned longitudinally by the action of the slide 68 and the associated mechanism in Figure 5 as described hereinbefore. During cycle point 13 the print hammer 222 is actuated. During cycle points 14, 15 and 16 the slides 68 and 76 are restored to the left and the set-up mechanisms 65 are restored to normal.

Figure 12:
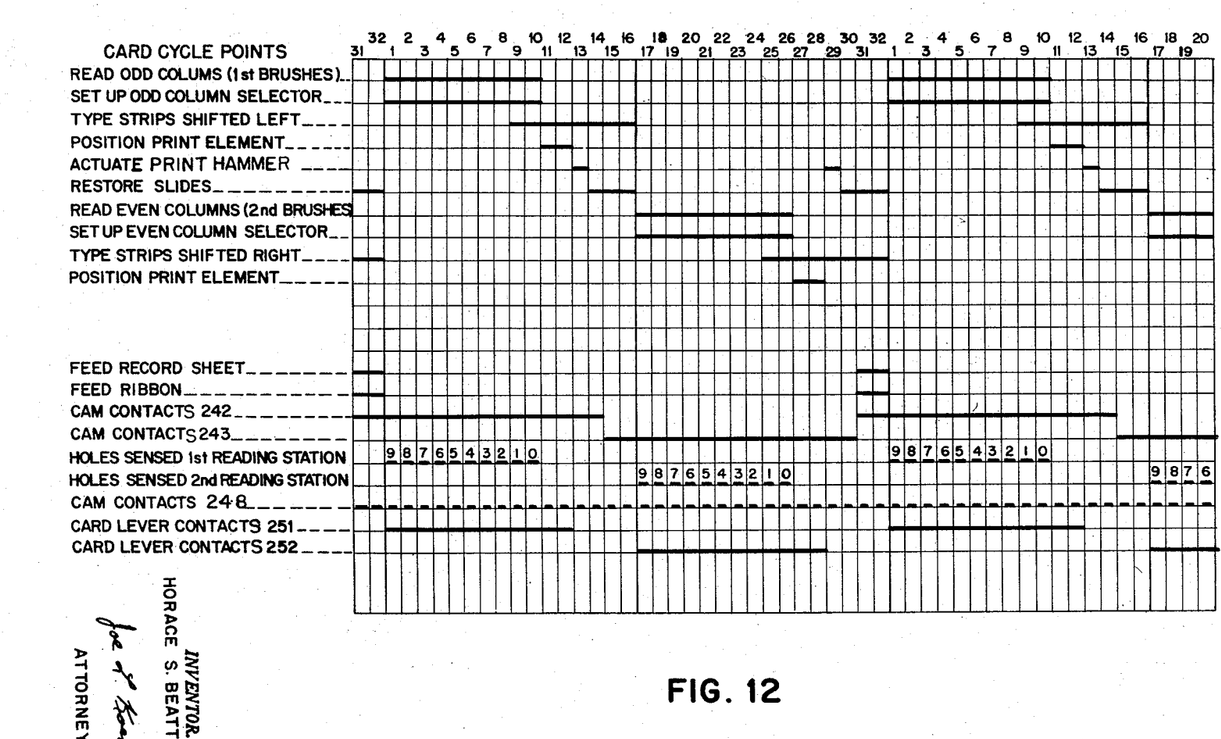
Figure 12 is a timing chart.

During cycle point 15, the cam contacts 242 break and the contacts 243 make preparatory to the sensing of the even numbered columns of the same card at the second read station. During cycle points 17 through 26, the odd numbered numeric positions are sensed serially from nine through zero, as described hereinbefore for the even numbered numeric positions at the first reading station with the cam contacts 248 making and breaking as described. During cycle point 25, the type element strips 134 are shifted laterally to the even numbered print columns. After cycle point 26 the type element strips are shifted longitudinally to position the selected type elements at the print line and at cycle point 29 the print hammer is again actuated. During cycle points 30, 31 and 32, the slides 68 and 76 are restored to the left. During cycle point 31, the contacts 243 break and the contacts 242 make preparatory to the sensing of the odd numbered columns of a second card at the first read station.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a printing apparatus, a type carrier having a plurality of type elements arranged thereon, said type carrier being movable whereby said type elements move past a print position, means operable for moving said type carrier differential multiples of a predetermined increment to move differentially selected ones of said type elements to said print position, said means comprising a code bar, an actuating bar, means for reciprocating said code bar and said actuating bar in timed relation, a plurality of increment designated actuating bar engaging means interposable with said actuating bar for operation thereby, means corresponding to said actuating bar engaging means and operable selectively for interposing said actuating bar engaging means, a plurality of increment designated code bar engaging means, corresponding to respective said actuating bar engaging means, normally latching corresponding said selectively operable means in inoperative positions and interposable with said code bar for releasing said corresponding means to move said corresponding actuating bar engaging means to said interposed positions, an electromagnet, means operable by said electromagnet for interposing selected ones of said code bar engaging means in accordance with the type element to be selected, means operable by the interposed ones of said actuating bar engaging means for moving said type carrier differential numbers of increments in accordance with the increment designations of said interposed actuating bar engaging means, and means for energizing said electromagnet at differential times during the reciprocation of said code bar in accordance with the type element to be selected.

2. In a printing apparatus, a type carrier having a plurality of type elements spaced longitudinally thereon, said type carrier being movable to pass a print position, means operable for moving said type carrier differential multiples of a predetermined increment to move differentially selected ones of said type elements to said print position, said means comprising a code bar, an actuating bar, means for reciprocating said code bar and said actuating bar in timed relation, a plurality of increment designated code bar engaging means, a plurality of increment designated actuating bar engaging means corresponding to said code bar engaging means, an electromagnet, means operable by said electromagnet for actuating at least one of said plurality of code bar engaging means in accordance with the type element to be selected, means operable by said code bar engaging means, when engaged, for actuating corresponding said increment designated actuating bar engaging means, means operable by said actuating bar engaging means, when engaged, for moving said type carrier differential numbers of increments in accordance with the increment designations of respective actuating bar engaging means, and means for energizing said electromagnet at differential times during the reciprocation of said code bar whereby various combinations of said code bar engaging means are actuated in accordance with the coding of said code bar.

3. In a printing apparatus, a type carrier having a plurality of type elements spaced longitudinally thereon, said type carrier being movable to pass a print position, means operable for moving said type carrier differential multiples of a predetermined increment to move differentially selected ones of said type elements to said print position, said means comprising a code bar, an actuating bar, means for reciprocating said code bar and said actuating bar in timed relation, a plurality of increment designated code bar engaging means, a plurality of increment designated actuating bar engaging means corresponding to said code bar engaging means, means intermediate corresponding said code bar engaging means and said actuating bar engaging means normally latched by said code bar engaging means and operative when unlatched to engage said corresponding actuating bar engaging means with said actuating bar, an electromagnet, means operable by said electromagnet for actuating at least one of said plurality of code bar engaging means in accordance with the type element to be selected, means operable by said actuating bar engaging means, when engaged, for moving said type carrier differential numbers of increments in accordance with the increment designations of respective actuating bar engaging means, and means for energizing said electromagnet at differential times during the reciprocation of said code bar whereby various combinations of said code bar engaging means are actuated in accordance with the coding of said code bar.

4. In a printing apparatus, a type carrier having a plurality of type elements arranged thereon, said type carrier being movable whereby said type elements may be moved to a print position, means operable for moving said type carrier differential multiples of a predetermined increment to move differentially selected ones of said type elements to said print position, said means comprising a reciprocated code bar, a reciprocated actuating bar, means engageable with said code bar in various combinations dependent upon when, during the reciprocation of said code bar, said engageable means are engaged therewith, corresponding means operable by the last said means for engaging said actuating bar, means operable by said corresponding means, when engaged with said actuating bar, for moving said type carrier differential amounts dependent upon said various combinations, means for engaging said engageable means with said code bar, and means for actuating the last said means at different times during the reciprocation of said code bar in accordance with the type element to be selected.

5. In a printing apparatus, a type carrier having a plurality of type elements arranged thereon, said type carrier being movable to pass a print position, means operable for moving said type carrier differential multiples of a predetermined increment to move differentially selected ones of said type elements to said printing position, said means comprising a plurality of actuatable character setup elements, cyclically operable means co-operable with said setup elements in various combinations dependent upon the time during said cycle when said setup elements are actuated, a plurality of means corresponding to said plurality of setup elements and operable by respectively corresponding ones of said setup elements, when actuated, cyclically operable means for engaging operated ones of said plurality of corresponding means, means operable by engaged ones of said corresponding means for moving said type carrier said differential multiples of said predetermined increment in accordance with said various combinations of said actuated setup elements, and means operable at differential times during a cycle of the first said cyclically operable means for actuating said plurality of actuatable character setup elements.

6. In a printing apparatus, a type carrier having a plurality of type elements arranged thereon, said type carrier being movable to pass a print position, a wire, means operable to foreshorten said wire by differential multiples of a predetermined increment to move differentially selected ones of said type elements to said print position, said means comprising a code bar, an actuating bar, means for reciprocating said code bar and said actuating bar in timed relation, an electromagnet, means operable by said electromagnet for actuating a plurality of increment designated code bar engaging means, means operable by said code bar engaging means, when engaged, for actuating a corresponding plurality of increment designated actuating bar engaging means, means operable by said actuating bar engaging means, when engaged, for foreshortening said wire differential numbers of increments in accordance with the increment designations of respective actuating bar engaging means, means for energizing said electromagnet at differential times during the reciprocation of said code bar whereby various combinations of said code bar engaging means are actuated in accordance with the coding of said code bar, and means for restoring said type carrier.

7. In a printing apparatus, a type carrier having a plurality of type elements arranged thereon, said type carrier being movable to pass a print position, a wire, means operable to foreshorten said wire by different multiples of a predetermined increment to move differential selected ones of said type elements to said print position, said means comprising a reciprocated code bar, a reciprocated actuating bar, means engageable with said code bar in various combinations dependent upon when, during the reciprocation of said code bar, said means are engaged therewith, corresponding means operable by the last said means for engaging said actuating bar, means operable by said corresponding means, when engaged with said actuating bar, for foreshortening said wire differential amounts dependent upon said various combinations, means for engaging said engageable means with said code bar, means for actuating the last said means at differential times during the reciprocation of said code bar, and means for restoring said type carrier.

8. In a printing apparatus, a type carrier having a plurality of type elements arranged thereon, said type carrier being movable to pass a print position, a wire, means operable to foreshorten said wire by differential multiples of a predetermined increment to move differentially selected ones of said type elements to said print position, said means comprising a plurality of actuatable character setup elements, cyclically operable means co-operable with said setup elements in various combinations dependent upon the time during said cycle when said setup elements are actuated, a plurality of means corresponding to said plurality of setup elements and operable by respectively corresponding ones of said setup elements when actuated, cyclically operable means for engaging operated ones of said corresponding means, means operable by engaged ones of said corresponding means for foreshortening said wire said differential multiples of said predetermined increment in accordance with said various combinations of said actuated setup elements, means operable at differential times during a cycle of the first said cyclically operable means for actuating said plurality of actuatable character setup elements, and means for restoring said type carrier.

References Cited in the file of this patent

UNITED STATES PATENTS

| | | |
|---|---|---|
| 1,863,098 | Borel | June 14, 1932 |